United States Patent
Yagasaki (10) Patent No.: US 9,103,412 B2
(45) Date of Patent: Aug. 11, 2015

(54) ENDLESS POWER TRANSMISSION BELT-TYPE CONTINUOUSLY VARIABLE TRANSMISSION

(75) Inventor: Toru Yagasaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/347,294

(22) PCT Filed: Sep. 28, 2011

(86) PCT No.: PCT/JP2011/072228
§ 371 (c)(1),
(2), (4) Date: Mar. 26, 2014

(87) PCT Pub. No.: WO2013/046367
PCT Pub. Date: Apr. 4, 2013

(65) Prior Publication Data
US 2014/0235381 A1  Aug. 21, 2014

(51) Int. Cl.
*F16H 55/56* (2006.01)
*F16H 9/16* (2006.01)
(Continued)

(52) U.S. Cl.
CPC .................. *F16H 9/16* (2013.01); *F16H 9/125* (2013.01); *F16H 55/56* (2013.01); *F16H 61/66272* (2013.01)

(58) Field of Classification Search
CPC ........... F16H 9/125; F16H 55/56; F16H 5/18; F16H 9/18; F16H 9/24
USPC ........................................................... 474/8
See application file for complete search history.

(56) References Cited

U.S. PATENT DOCUMENTS 2,893,254 A * 7/1959 Grover ............................ 474/23
3,016,755 A * 1/1962 Dittrich .............................. 474/8
(Continued)

FOREIGN PATENT DOCUMENTS

JP  62-146044 U  9/1987
JP  64-012167 A  1/1989
(Continued)

OTHER PUBLICATIONS

Japanese Office Action application No. 2013-535718 dated Jan. 21, 2015.
(Continued)

*Primary Examiner* — Henry Liu
(74) *Attorney, Agent, or Firm* — Squire Patton Boggs (US) LLP (57) ABSTRACT

Among V-faces (48) of a pulley (15), a portion (48a) that is radially further inside than a predetermined position P1 is susceptible to slip against a metal belt (19), but making a shape of the generatrix of the portion (48a) on the radially inner side into a straight line enables a large coefficient of friction against the metal belt (19) to be ensured, thereby reliably preventing slip from occurring. Furthermore, by making, among the V-faces (48) of the pulley (15), a shape of the generatrix of a portion (48b) that is radially further outside than the predetermined position P1 into a curved line that curves in a direction that compensates for misalignment (C) of the metal belt (19) ensures that the metal belt (19) smoothly bites into the V-faces (48), thereby enabling the durability of the metal belt (19) or the pulley (15) to be enhanced. When the shape of the generatrix of the V-faces (48) is a curved line, the coefficient of friction against the metal belt (19) decreases, but since the portion (48b) of the V-faces (48) on the radially outer side is a portion that is naturally resistant to the occurrence of slip of the metal belt (19), there is no possibility of slip occurring even if the coefficient of friction decreases.

8 Claims, 10 Drawing Sheets

(51) Int. Cl.
*F16H 9/12* (2006.01)
*F16H 61/662* (2006.01)

(56) References Cited

U.S. PATENT DOCUMENTS

| | | | | |
|---|---|---|---|---|
| 3,548,670 | A * | 12/1970 | Schnegg et al. | 474/8 |
| 4,631,042 | A * | 12/1986 | Rattunde | 474/8 |
| 4,795,406 | A * | 1/1989 | Dittrich et al. | 474/8 |
| 5,328,412 | A * | 7/1994 | Durum | 474/8 |
| 5,685,793 | A * | 11/1997 | Van Blaricom | 474/33 |
| 5,792,013 | A * | 8/1998 | Heinrich et al. | 474/8 |
| 6,206,796 | B1 * | 3/2001 | Lee | 474/84 |
| 6,416,433 | B1 * | 7/2002 | Linnenbrugger | 474/8 |
| 6,656,068 | B2 * | 12/2003 | Aitcin | 474/8 |
| 6,926,631 | B2 * | 8/2005 | Brandsma et al. | 474/8 |
| 7,037,225 | B2 * | 5/2006 | Takagi | 474/8 |
| 7,431,674 | B2 * | 10/2008 | Van Der Leest et al. | 474/8 |
| 7,506,718 | B2 * | 3/2009 | Morita et al. | 180/376 |
| 7,699,728 | B2 * | 4/2010 | Pritchett | 474/8 |
| 8,162,785 | B2 * | 4/2012 | Wagner | 474/8 |
| 8,491,426 | B2 * | 7/2013 | Van Der Leest | 474/8 |
| 2002/0042313 | A1 * | 4/2002 | Aitcin | 474/8 |
| 2003/0144097 | A1 * | 7/2003 | Brandsma et al. | 474/8 |
| 2004/0018903 | A1 * | 1/2004 | Takagi | 474/8 |
| 2006/0058125 | A1 * | 3/2006 | Van Der Leest et al. | 474/8 |
| 2006/0058128 | A1 * | 3/2006 | Glas | 474/8 |
| 2007/0117663 | A1 * | 5/2007 | Van Der Leest et al. | 474/8 |
| 2009/0156337 | A1 * | 6/2009 | Wagner | 474/8 |
| 2010/0130318 | A1 * | 5/2010 | Morgan, Jr. | 474/8 |
| 2011/0098144 | A1 * | 4/2011 | Van Der Leest | 474/8 |

FOREIGN PATENT DOCUMENTS

| | | |
|---|---|---|
| JP | 06-307510 A | 11/1994 |
| JP | 7-92124 B2 | 10/1995 |
| JP | 2004060699 A | 2/2004 |
| JP | 2009-063048 A | 3/2009 |
| JP | 4288080 B2 | 7/2009 |

OTHER PUBLICATIONS

International Search Report dated Dec. 27, 2011 corresponding to International Patent Application No. PCT/JP2011/072228 and English translation thereof.

* cited by examiner

(A) WHEN RATIO IS LOW (B) WHEN RATIO IS OD

ENDLESS POWER TRANSMISSION BELT-TYPE CONTINUOUSLY VARIABLE TRANSMISSION

TECHNICAL FIELD

The present invention relates to an endless power transmission belt-type continuously variable transmission equipped with a drive pulley formed from a fixed-side pulley half and a movable-side pulley half, a driven pulley formed from a fixed-side pulley half and a movable-side pulley half, and an endless power transmission belt wound around a V-face of the drive pulley and a V-face of the driven pulley, a gear ratio being changed by increasing a groove width of one of the drive pulley and the driven pulley and decreasing a groove width of the other.

BACKGROUND ART

A drive pulley and a driven pulley of a belt type continuously variable transmission are formed from a fixed-side pulley half that is fixedly provided on a shaft and a movable-side pulley half that is axially slidably supported on a shaft and moves closer to or away from the fixed-side pulley half. Making the movable-side pulley half of the drive pulley move away from the fixed-side pulley half so as to increase the groove width of a V groove and making the movable-side pulley half of the driven pulley move closer to the fixed-side pulley half so as to decrease the groove width of a V groove changes the gear ratio to the LOW side, whereas making the movable-side pulley half of the drive pulley move closer to the fixed-side pulley half so as to decrease the groove width of the V groove and making the movable-side pulley half of the driven pulley move away from the fixed-side pulley half so as to increase the groove width of the V groove changes the gear ratio to the OD side.

When the movable-side pulley half is made to move closer to the fixed-side pulley half, the center of the V groove moves closer to the fixed-side pulley half, whereas when the movable-side pulley half is made to move away from the fixed-side pulley half, the center of the V groove moves away from the fixed-side pulley half; a displacement (that is, a misalignment) occurs in e axial direction between the centers of the V grooves of the drive pulley and the driven pulley accompanying the gear ratio being changed, and the misalignment increases and decreases between zero to a maximum value according to the gear ratio. When such a misalignment occurs, a section of a metal belt wound around the drive pulley and a section thereof wound around the driven pulley are displaced in the axial direction, and due to the rotating face of the metal belt deviating from a plane perpendicular to the axis there is the problem that the durability of the metal belt or the V-face of the pulley is affected.

In order to minimize the influence of misalignment of the belt type continuously variable transmission, an arrangement is known from Patent Document 1 below in which setting is carried out so that the misalignment becomes zero when the gear ratio of the belt type continuously variable transmission is in a TOP state, that is, when the load acting on the metal belt becomes a maximum, metal elements of the metal belt are made to bite into the V groove of the pulley in a straight line, and the behavior of the metal belt is thus stabilized, thereby enhancing the durability.

Furthermore, in order to minimize the influence of misalignment of the belt type continuously variable transmission, an arrangement is known from Patent Document 2 below in which the shape of the generatrix of the V-face of the pulley, which conventionally is straight, is formed into an arc shape that protrudes toward the metal belt side, and the side face of an element of the metal belt that comes into contact with the V-face of the pulley is formed into an arc shape that protrudes toward the pulley side.

RELATED ART DOCUMENTS

Patent Documents

Patent Document 1: Japanese Patent Publication No. 7-92124
Patent Document 2: Japanese Patent No. 4288080

DISCLOSURE OF INVENTION

Problems to be Solved by the Invention

However, although the arrangement disclosed in Patent Document 1 above can make the misalignment zero when the gear ratio is in the TOP state, when the range for the gear ratio is increased, the misalignment increases when the gear ratio is in LOW and OD states, and there is a possibility that the durability of the metal belt or the pulley will be affected.

Furthermore, in the arrangement disclosed in Patent Document 2 above, since the V-face of the pulley and the side face of the element of the metal belt are curved so as to protrude toward each other, the two are in point contact to thus decrease the coefficient of friction of the areas in contact, thereby causing a possibility that slip will occur between the pulley and the metal belt. In order to prevent this slip, a pulley lateral pressure for compressing the metal belt may be increased, but this will give rise to problems such as an increase in the size of an oil pump or a large consumption of energy for driving the oil pump.

The present invention has been accomplished in light of the above circumstances, and it is an object thereof to provide an endless power transmission belt-type continuously variable transmission in which the influence of misalignment of a metal belt can be compensated for while preventing slip between a pulley and the metal belt.

Means for Solving the Problems

In order to attain the above object, according to a first aspect of the present invention, there is provided an endless power transmission belt-type continuously variable transmission comprising a drive pulley formed from a fixed-side pulley half and a movable-side pulley half, a driven pulley formed from a fixed-side pulley half and a movable-side pulley half, and an endless power transmission belt wound around a V-face of the drive pulley and a V-face of the driven pulley, a gear ratio being changed by increasing a groove width of one of the drive pulley and the driven pulley and decreasing a groove width of the other, characterized in that the V-faces of at least the fixed-side pulley halves of the drive pulley and the driven pulley have a straight-line shape for the generatrix of a portion that is radially further inside than a predetermined position and have a curved shape for the generatrix of a portion that is radially further outside than the predetermined position, the curved shape being curved in a direction that compensates for a misalignment of the endless power transmission belt.

Further, according to a second aspect of the present invention, in addition to the first aspect, the shape of the generatrix of the V-faces of the movable-side pulley halves of the drive pulley and the driven pulley is symmetrical to the shape of the generatrix of the V-faces of the fixed-side pulley halves of the drive pulley and the driven pulley.

Furthermore, according to a third aspect of the present invention, in addition to the first or second aspect, the predetermined position is a position at which the endless power transmission belt makes contact with the V-faces of the drive pulley and the driven pulley when the gear ratio is 1.

Moreover, according to a fourth aspect of the present invention, in addition to any one of the first to third aspects, an amount of compensation for the misalignment is set so as to be less than the misalignment value.

A metal belt 19 of an embodiment corresponds to the endless power transmission belt of the present invention.

Effects of the Invention

In accordance with the first aspect of the present invention, among the V-faces of at least the fixed-side pulley halves of the drive pulley and the driven pulley, the portion that is radially further inside than the predetermined position is susceptible to slip against the endless power transmission belt, but making the shape of the generatrix of the portion on the radially inner side into a straight line enables a large coefficient of friction against the endless power transmission belt to be ensured, thereby reliably preventing slip from occurring. Furthermore, by making, among the V-faces of at least the fixed-side pulley halves of the drive pulley and the driven pulley, the shape of the generatrix of the portion that is radially further outside than the predetermined position into a curved line that curves in a direction that compensates for misalignment of the endless power transmission belt ensures that the endless power transmission belt smoothly bites into the V-faces, thereby enabling the durability of the endless power transmission belt or the pulley to be enhanced. When the shape of the generatrix of the V-faces is a curved line, the coefficient of friction against the endless power transmission belt decreases, but since the portion of the V-faces on the radially outer side is a portion that is naturally resistant to the occurrence of slip of the endless power transmission belt, there is no possibility of slip occurring even if the coefficient of friction decreases.

Furthermore, in accordance with the second aspect of the present invention, since the shape of the generatrix of the V-faces of the movable-side pulley halves of the drive pulley and the driven pulley is symmetrical to the shape of the generatrix of the V-faces of the fixed-side pulley halves, it is possible to evenly compress the opposite side faces of the endless power transmission belt held between the V-faces of the two pulleys, thereby preventing the metal belt from tilting.

Moreover, in accordance with the third aspect of the present invention, since the predetermined position, at which the shape of the generatrix of the V-face switches over from a straight line to a curved line, is a position at which the endless power transmission belt makes contact with the V-faces of the drive pulley and the driven pulley when the gear ratio is 1, it is possible to most appropriately achieve a balance between compensation for misalignment and prevention of slip of the endless power transmission belt.

Furthermore, in accordance with the fourth aspect of the present invention, since the amount of compensation for the misalignment is set so as to be less than the misalignment value, it is possible to freely set as necessary a balance between reduction in the coefficient of friction and compensation for misalignment due to the shape of the generatrix of the radially outer side portion of the V-face being curved.

EXPLANATION OF REFERENCE NUMERALS AND SYMBOLS

15 Drive pulley
15a Fixed-side pulley half
15b Movable-side pulley half
17 Driven pulley
17a Fixed-side pulley half
17b Movable-side pulley half
19 Metal belt (endless power transmission belt)
48 V-face
48a Radially inner side portion
48b Radially outer side portion
C Misalignment

MODES FOR CARRYING OUT THE INVENTION

A mode for carrying out the present invention is explained below by reference to FIG. 1 to FIG. 10.

First Embodiment

Figure 1:
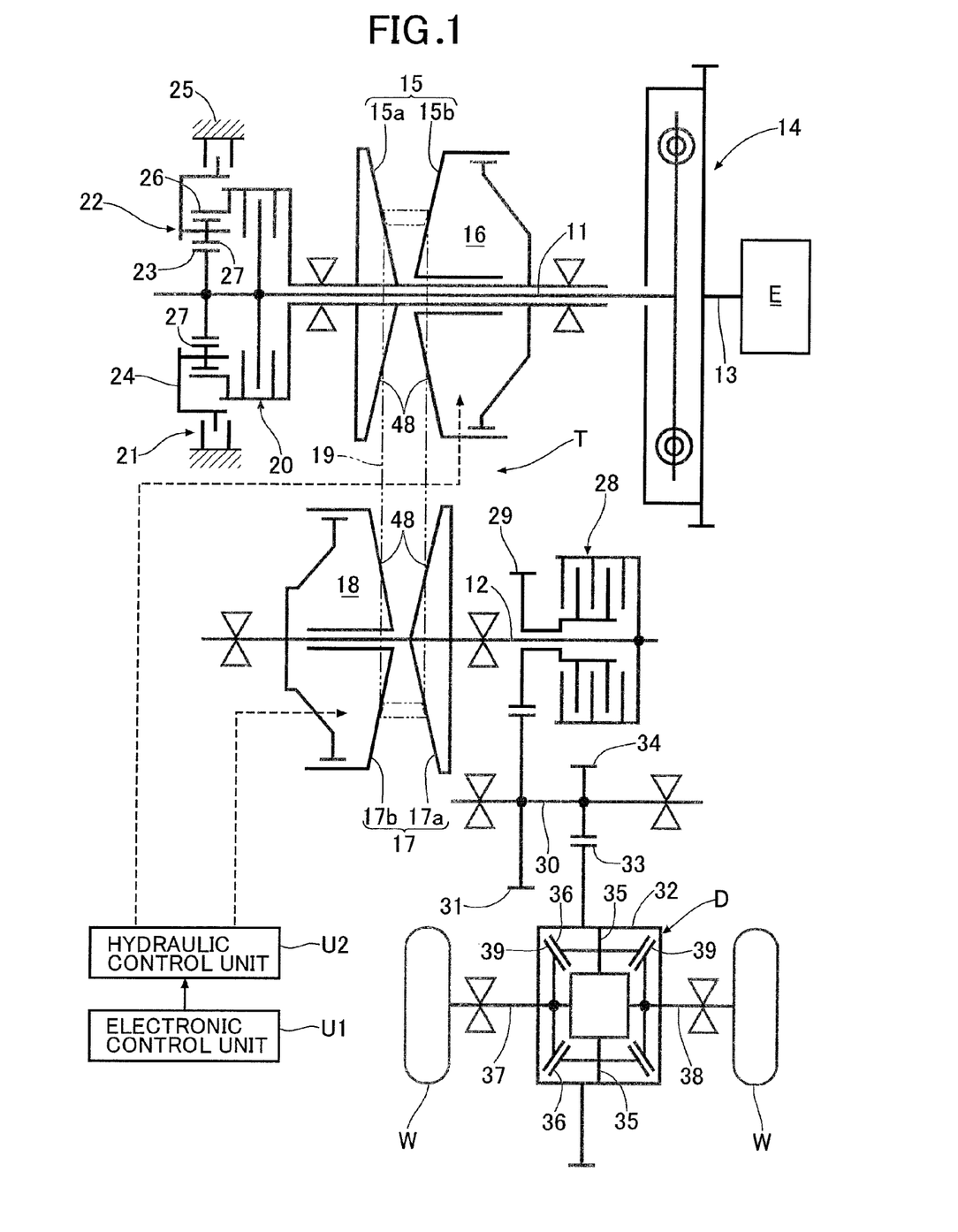
FIG. 1 is a skeleton diagram of a power transmission system of a vehicle equipped with a belt type continuously variable transmission. (first embodiment)

As shown in FIG. 1, a belt-type continuously variable transmission T for a vehicle includes a drive shaft 11 and a driven shaft 12 that are disposed in parallel to each other, and a crankshaft 13 of an engine E is connected to the drive shaft 11 via a damper 14.

A drive pulley 15 supported on the drive shaft 11 includes a fixed-side pulley half 15a that is rotatable relative to the drive shaft 11 and a movable-side pulley half 15b that is axially slidable relative to the fixed-side pulley half 15a. The groove width between the movable-side pulley half 15b and the fixed-side pulley half 15a can be varied by means of oil pressure acting on a hydraulic chamber 16. A driven pulley 17 supported on the driven shaft 12 includes a fixed-side pulley half 17a that is fixedly provided on the driven shaft 12 and a movable-side pulley half 17b that is axially slidable relative to the fixed-side pulley half 17a. The groove width between the movable-side pulley half 17b and the fixed-side pulley half 17a can be varied by means of oil pressure acting on a hydraulic chamber 18. A metal belt 19 is wound around the drive pulley 15 and the driven pulley 17, the metal belt 19 having a large number of metal elements fitted on two metal ring assemblies.

Provided on a shaft end of the drive shaft 11 is a forward-reverse switching mechanism 22, which is a single pinion type planetary gear mechanism, comprising a forward clutch 20 and a reverse brake 21. The forward clutch 20 engages when establishing a forward gear position and transmits rotation of the drive shaft 11 to the drive pulley 15 in the same direction. The reverse brake 21 engages when establishing a reverse gear position and transmits rotation of the drive shaft 11 to the drive pulley 15 in the reverse direction. A sun gear 23 of the forward-reverse switching mechanism 22 is fixedly provided on the drive shaft 11, a carrier 24 can be restrained to a casing 25 by means of the reverse brake 21, and a ring gear 26 can be joined to the drive pulley 15 by means of the forward clutch 20. A plurality of pinions 27 supported on the carrier 24 mesh simultaneously with the sun gear 23 and the ring gear 26.

A starting clutch 28 provided at a shaft end of the driven shaft 12 joins a first reduction gear 29, which is relatively rotatably supported on the driven shaft 12, to the driven shaft 12. A second reduction gear 31 meshing with the first reduction gear 29 is fixedly provided on a reduction shaft 30 disposed in parallel to the driven shaft 12. A final drive gear 34 fixedly provided on the reduction shaft 30 meshes with a final driven gear 33 fixedly provided on a gear box 32 of a differential gear D. Side gears 39 and 39 provided at extremities of a left axle 37 and a right axle 38 relatively rotatably supported on the gear box 32 mesh with a pair of pinions 36 and 36 supported on the gear box 32 via pinion shafts 35 and 35. Driven wheels W and W are connected to extremities of the left and right axles 37 and 38.

Therefore, when a forward range is selected by means of a select lever, the forward clutch 20 is first engaged by means of a command from a hydraulic control unit U2 operated by an electronic control unit U1, and as a result the drive shaft 11 is integrally joined to the drive pulley 15. Subsequently, the starting clutch 28 is engaged, and the torque of the engine E is transmitted to the driven wheels W and W via the path: drive shaft 11→forward-reverse switching mechanism 22→drive pulley 15→metal belt 19→driven pulley 17→driven shaft 12→staging clutch 28→first reduction gear 29→second reduction gear 31→reduction shaft 30→final drive gear 34→final driven gear 33→differential gear D→axles 37 and 38, thus causing the vehicle to start moving forward. When a reverse range is selected by means of the select lever, the reverse brake 21 is engaged by means of a command from the hydraulic control unit U2, the drive pulley 15 is driven in the opposite direction to the rotational direction of the drive shaft 11, and the vehicle therefore starts moving in reverse by engagement of the starting clutch 28.

When the vehicle starts in this way, the oil pressure supplied to the hydraulic chamber 16 of the drive pulley 15 by means of a command from the hydraulic control unit U2 increases, the movable-side pulley half 15b of the drive pulley 15 moves closer to the fixed-side pulley half 15a to thus increase the effective radius, the oil pressure supplied to the hydraulic chamber 18 of the driven pulley 17 decreases, the movable-side pulley half 17b of the driven pulley 17 moves away from the fixed-side pulley half 17a to thus decrease the effective radius, and the gear ratio of the belt type continuously variable transmission therefore changes continuously from the LOW side to the OD side.

Figure 2:
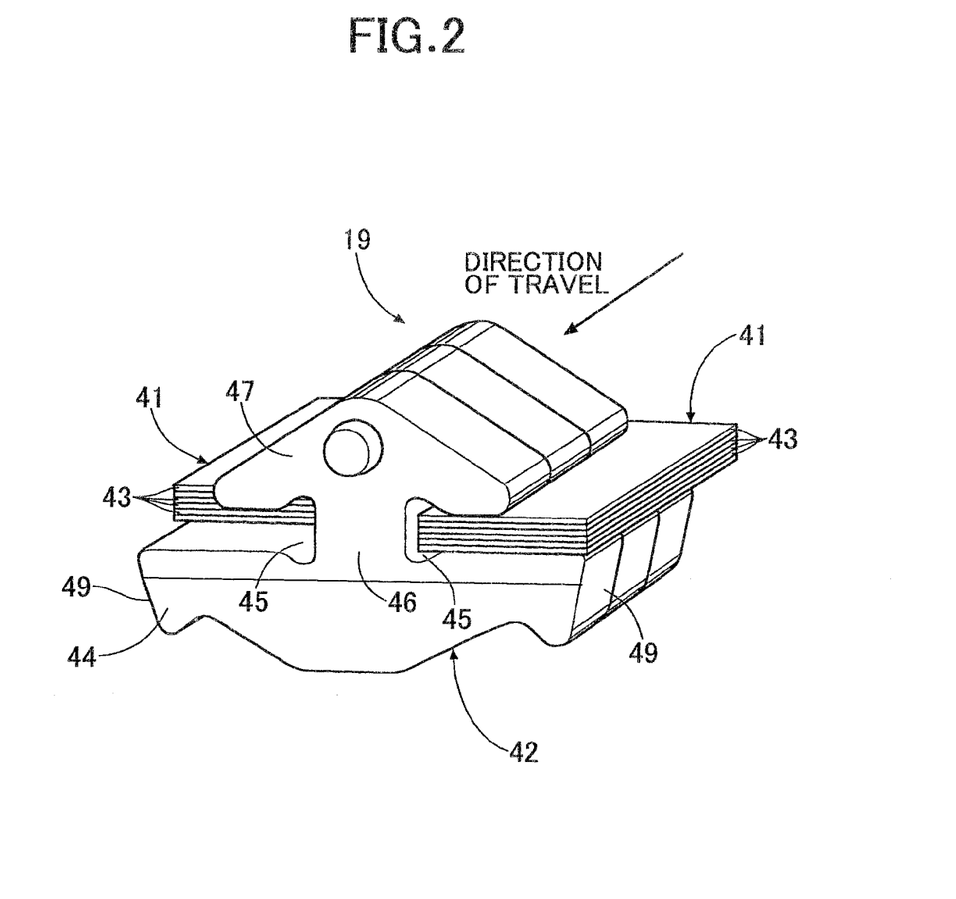
FIG. 2 is a perspective view of a portion of a metal belt. (first embodiment)

As shown in FIG. 2, the metal belt 19 is formed by supporting a large number of metal elements 42 on a pair of left and right metal ring assemblies 41 and 41, and each metal ring assembly 41 is formed by layering a plurality of metal rings 43. The metal element 42, which is formed by stamping a metal plate material, includes an element main body 44, a neck part 46 positioned between a pair of left and right ring slots 45 and 45, with which the metal ring assemblies 41 and 41 engage, and a substantially triangular ear part 47 connected to a radially outer side of the element main body 44 via the neck part 46. Formed on opposite end parts in the left-and-right direction of the element main body 44 are a pair of pulley abutment faces 49 and 49 that can abut against V-faces 48 and 48 of the drive pulley 15 and the driven pulley 17 (see FIG. 1).

The reason for a misalignment C occurring in the metal belt 19 is now explained by reference to FIGS. (4A)-(4C).

The drive pulley 15 and the driven pulley 17 are disposed in a positional relationship in which a line joining the fixed-side pulley halves 15a and 17a and a line joining the movable-side pulley halves 15b and 17b intersect each other. For example, on the drive pulley 15 side the fixed-side pulley half 15a is disposed on the left-hand side and the movable-side pulley half 15b is disposed on the right-hand side, whereas on the driven pulley 17 side the fixed-side pulley half 17a is disposed on the right-hand side and the movable-side pulley half 17b is disposed on the left-hand side. Due to such placement, the misalignment C of the metal belt 19 that occurs accompanying a change in the gear ratio can be minimized.

Figure 4:
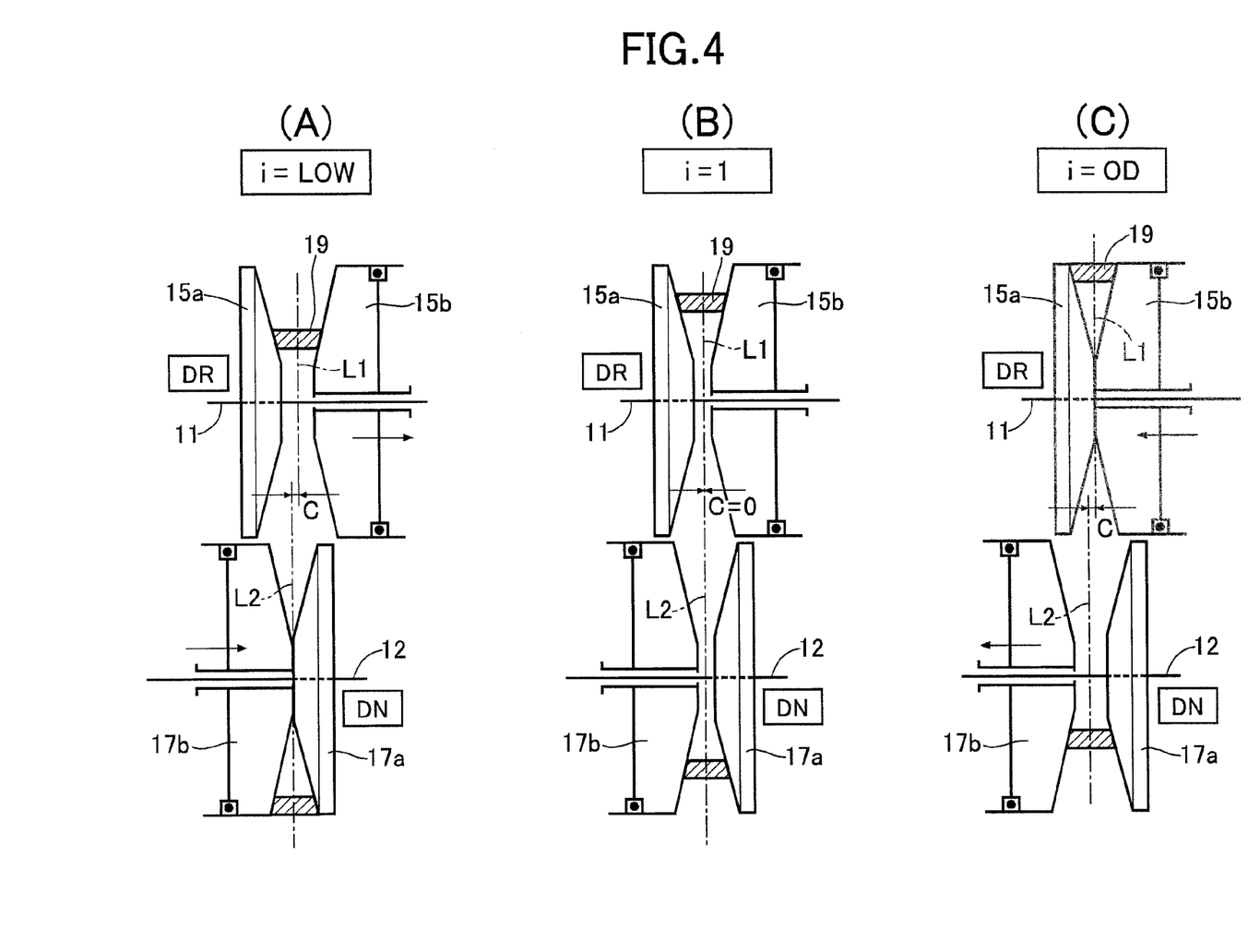
FIGS. 4A, 4B, and 4C are diagrams for explaining a mechanism via which misalignment occurs. (first embodiment)

FIG. 4 (B) shows a state in which the gear ratio i is 1; in this state a groove center line L1 of the drive pulley 15 and a groove center line L2 of the driven pulley 17 are aligned, the entirety of the metal belt 19 is disposed within the same plane, and the misalignment C becomes zero.

FIG. 4 (A) shows a state in which the gear ratio i is LOW; in this state the movable-side pulley half 15b of the drive pulley 15 moves rightward so as to move away from the fixed-side pulley half 15a and the groove center line L1 moves rightward, and the movable-side pulley half 17b of the driven pulley 17 moves rightward so as to move closer to the fixed-side pulley half 17a and the groove center line L2 moves rightward. In this way, in a state in which the gear ratio i is LOW, since both the movable-side pulley half 15b of the drive pulley 15 and the movable-side pulley half 17b of the driven pulley 17 move rightward, and both the groove center lines L1 and L2 of the two pulleys 15 and 17 move rightward, the occurrence of the misalignment C can be minimized, but since the amount of rightward movement of the groove center line L1 of the drive pulley 15 is larger than the amount of rightward movement of the groove center line L2 of the driven pulley 17, the misalignment C occurs such that the driven pulley 17 side is biased leftward relative to the drive pulley 15 side.

FIG. 4 (C) shows a state in which the gear ratio i is OD; in this state the movable-side pulley half 15b of the drive pulley 15 moves leftward so as to move closer to the fixed-side pulley half 15a and the groove center line L1 moves leftward, and the movable-side pulley half 17b of the driven pulley 17 moves leftward so as to move away from the fixed-side pulley half 17a and the groove center line L2 moves leftward. In this way, in a state in which the gear ratio i is OD, since both the movable-side pulley half 15b of the drive pulley 15 and the movable-side pulley half 17b of the driven pulley 17 move leftward, and both the groove center lines L1 and L2 of the two pulleys 15 and 17 move leftward, the occurrence of the misalignment C can be minimized, but since the amount of leftward movement of the groove center line L1 of the drive pulley 15 is smaller than the amount of leftward movement of the groove center line L2 of the driven pulley 17, the misalignment C occurs such that the driven pulley 17 side is biased leftward relative to the drive pulley 15 side.

Figure 3:
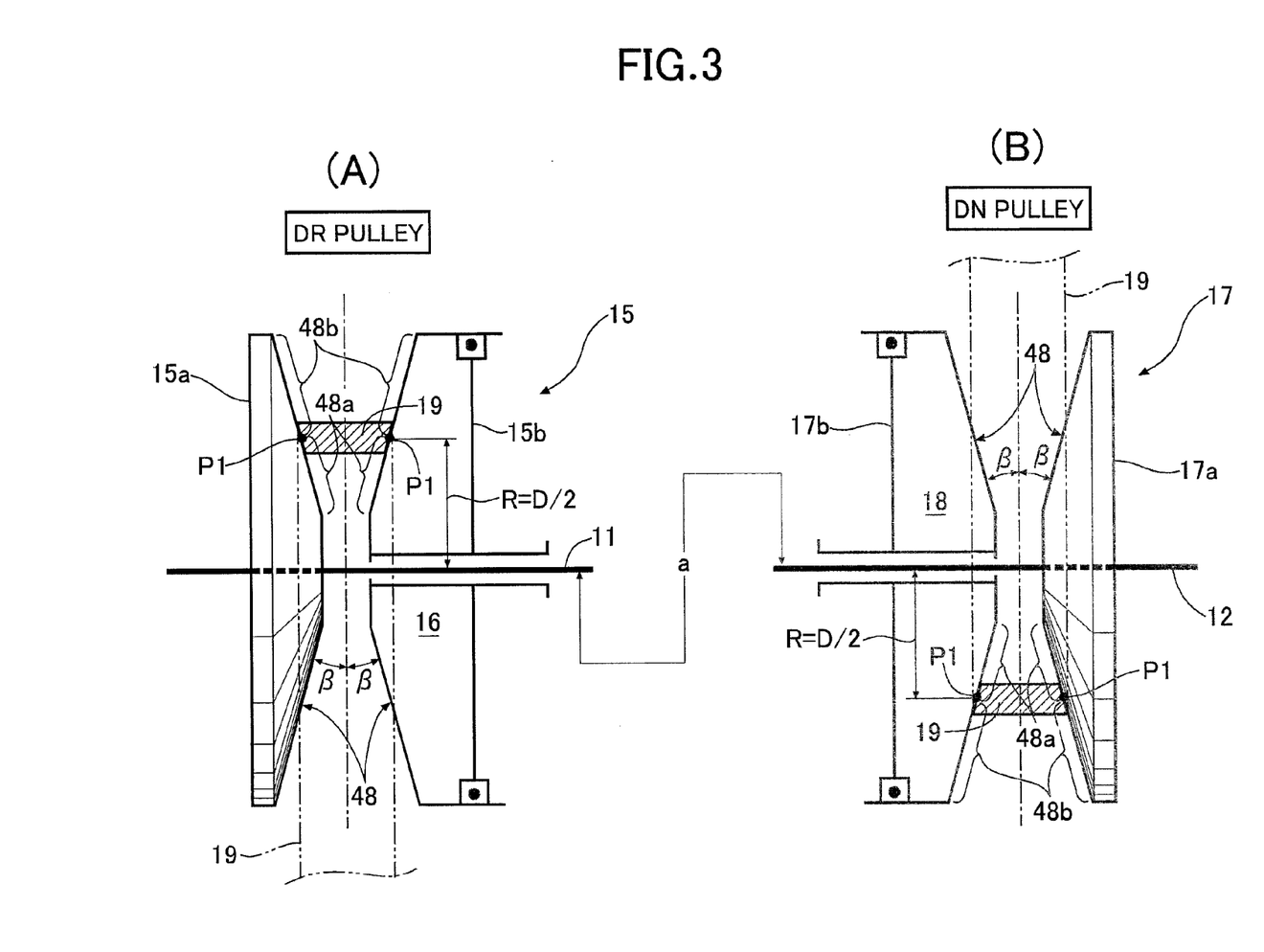
FIGS. 3A and 3B are enlarged views of a drive pulley and a driven pulley. (first embodiment)

As shown in FIGS. 3(A) and 3(B), when twice an effective radius R of the drive pulley 15 and the driven pulley 17 for a gear ratio of i=1 is D, an interaxial distance between the drive shaft 11 an the driven shaft 12 is a, and half the angle formed between the V-faces 48 and 48 of the drive pulley 15 and the driven pulley 17 is β (hereinafter, called a V-face angle), the misalignment C of the metal belt 19 is given by $$C=(D^2/\pi \times a)\times\{(i-1)^2/(i+1)^2\}\times \tan \beta.$$

The actual value of the misalignment C is a very small value of less than 1 mm even when at a maximum.

Figure 5:
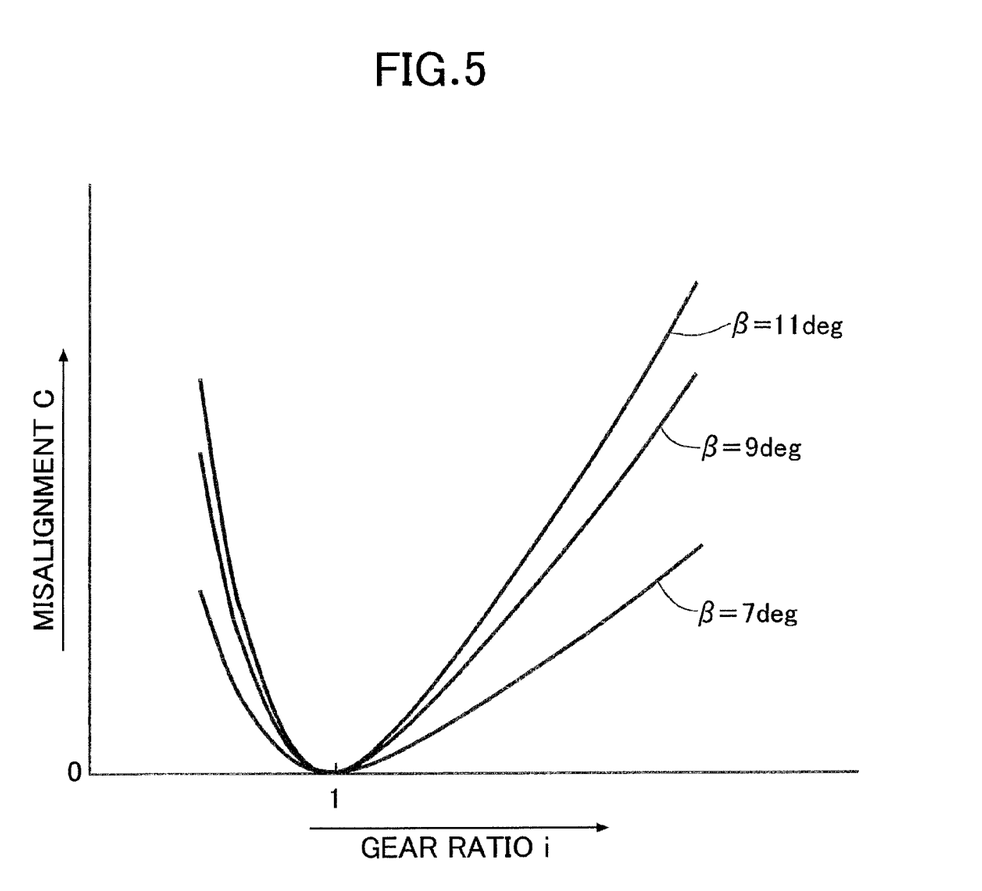
FIG. 5 is a graph showing the relationship between gear ratio and misalignment with respect to a plurality of V-face angles β. (first embodiment)

FIG. 5 shows the relationship between gear ratio i and misalignment C under conditions of L (peripheral length of the metal belt 19)=656 mm, D=110 mm, and a=155 mm for the three cases of β being 11 deg, 9 deg, and 7 deg.

As is clear from this figure, when the gear ratio i=1 the misalignment C=0; if the gear ratio i increases or decreases from that point, the misalignment C increases, and the more the V-face angle β increases the more the misalignment C increases.

Figure 6:
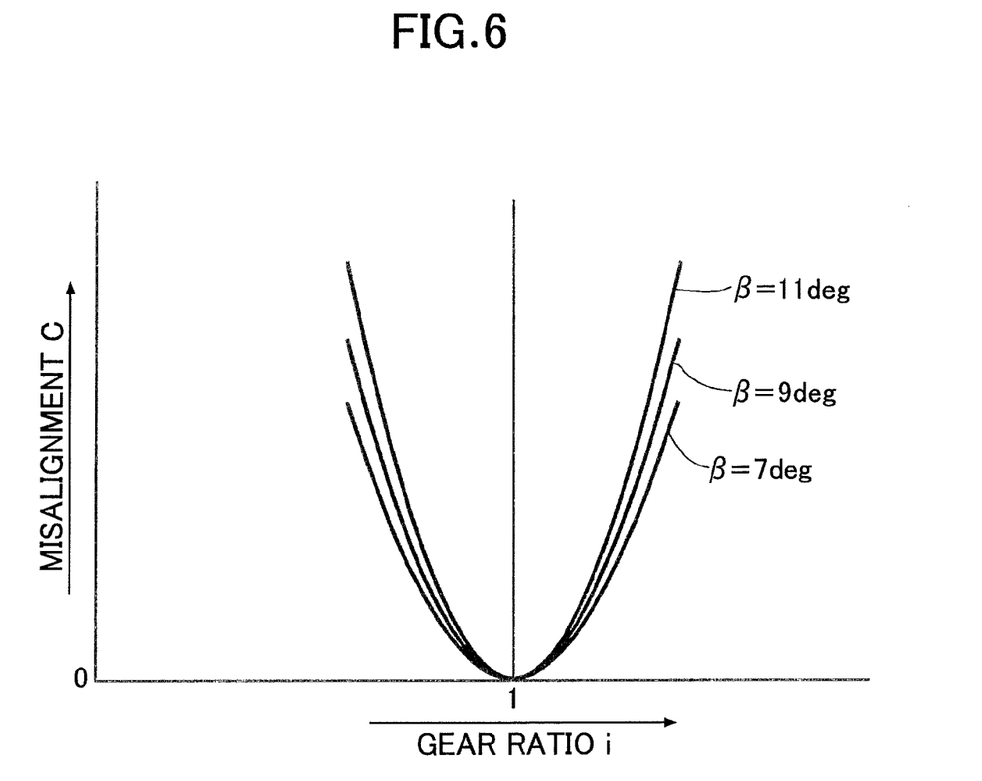
FIG. 6 is a graph in which the abscissa of FIG. 5 is logarithmic. (first embodiment)

FIG. 6 is one in which the abscissa of FIG. 5 is logarithmic, and it can be seen that the line showing the relationship between the gear ratio i and the misalignment C is symmetrical with respect to the ordinate.

Returning to FIGS. 3(A) and (3B), with regard to the shape of the V-faces 48 and 48 of the drive pulley 15 and the driven pulley 17, radially inner side portions 48a and 48a and radially outer side portions 48b and 48b, which are defined with respect to contact points P1 and P1 of the metal elements 42 on the V-faces 48 and 48 when the gear ratio i=1, are different from each other. That is, the V-faces 48 and 48 are basically formed from a conical face, and the generatrix of the cone of the radially inner side portions 48a and 48a is a straight line, whereas the generatrix of the cone of the radially outer side portions 48b and 48b is a curved line that expands so that they move away from each other in going toward the radially outer side. The shapes of the curved lines of the radially outer side portions 48b and 48b of the fixed-side pulley half 15a and the movable-side pulley half 15b of the drive pulley 15 and the fixed-side pulley half 17a and the movable-side pulley half 17b of the driven pulley 17 are all the same.

In this way, since the shapes of the radially outer side portions 48b of the V-faces 48 of the pulleys 15 and 17 are corrected in the axial direction only by a value corresponding to the misalignment C, even when the misalignment C occurs in the metal belt 19 accompanying the gear ratio i being changed, the metal belt 19 can be aligned in the groove centers of the pulleys 15 and 17 without receiving a load in the axial direction, the metal elements 42 of the metal belt 19 can smoothly bite into the V-faces 48 of the pulleys 15 and 17, and it is possible to prevent the durability from deteriorating due to abnormal abrasion, etc.

The axial positions of the movable-side pulley halves 15b and 17b are not fixed, and they can move closer to or further away from the corresponding fixed-side pulley halves 15a and 17a; even when the shape of the generatrix of the radially outer side portions 48b and 48b of the movable-side pulley halves 15b and 17b is a straight line, there is no influence on compensation for the misalignment C. However, when only the shape of the generatrix of the fixed-side pulley halves 15a and 17a is a curved line and the shape of the generatrix of the movable-side pulley halves 15b and 17b is a straight line, the metal elements 42 sandwiched between the fixed-side pulley halves 15a and 17a and the movable-side pulley halves 15b and 17b receive an uneven load and attempt to tilt, and there is therefore a possibility that this would cause abnormal abrasion, etc. For this reason, it is desirable for the shape of the generatrix of the radially outer side portions 48b and 48b of the movable-side pulley halves 15b and 17b to be symmetrical to the shape of the generatrix of the radially outer side portions 48b and 48b of the fixed-side pulley halves 15a and 17a.

The shape of the generatrix of the V-face 48 is now explained specifically by reference to FIGS. 7(A), 7(B), 8(A) and 8(B).

Figure 7:
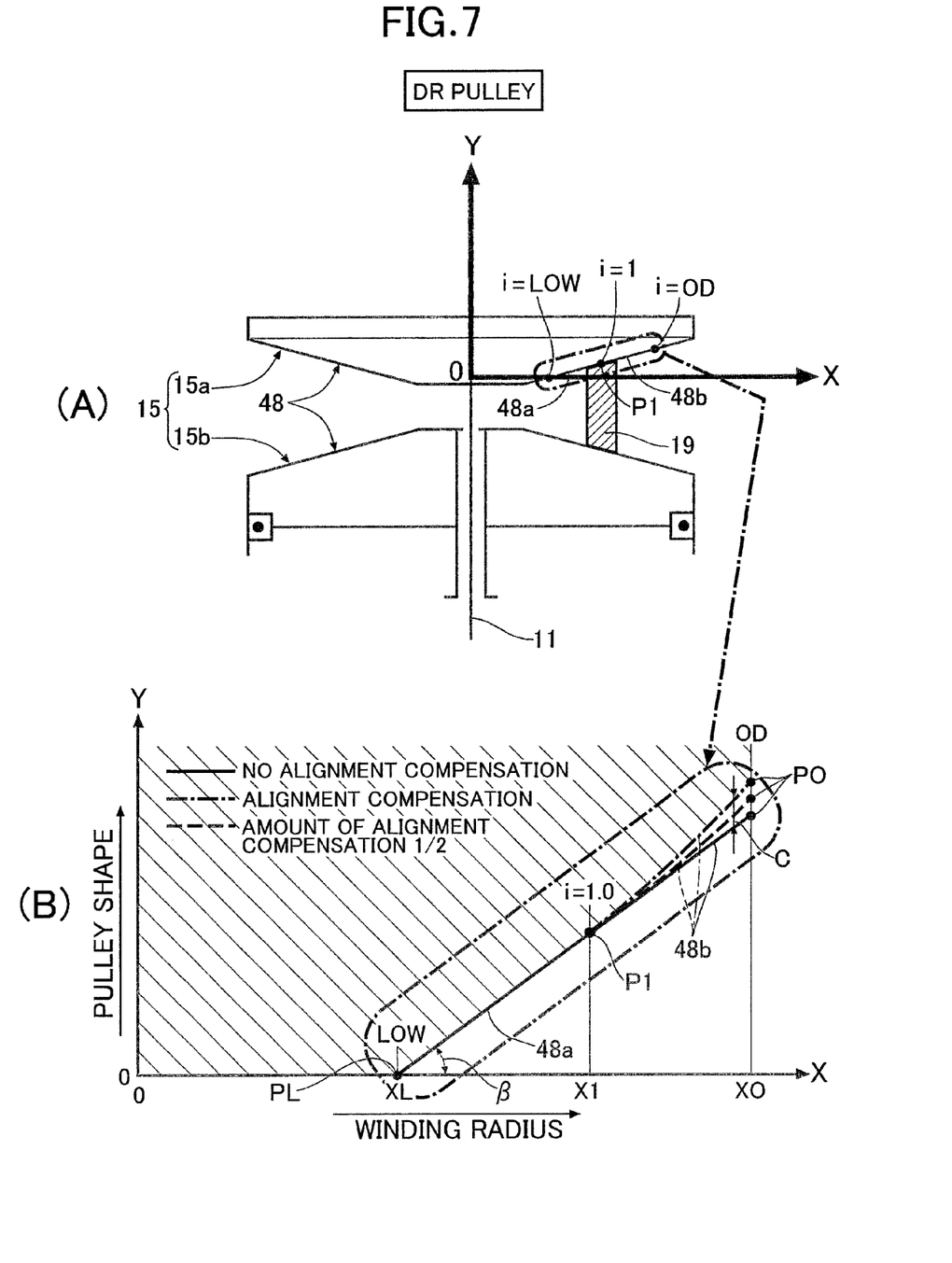
FIGS. 7A and 7B are diagrams for explaining the shape of the generatrix of the V-face of the drive pulley. (first embodiment)

FIG. 7 (A) shows the drive pulley 15, and the shape of a section of the V-face 48 encompassed by an oval is shown enlarged in FIG. 7 (B). In order to express the shape of the generatrix of the V-face 48 using an equation, a Y-axis is defined on the drive shaft 11 and an X-axis is defined on the radial direction of the drive pulley 15. P1 is a position of the contact point between the V-face 48 and the metal belt 19 when the gear ratio i is 1, and PL and PO are positions of the contact point when the gear ratio i is LOW and OD respectively. The X-axis is disposed so as to pass through PL. The X coordinates of PL, P1, and PO are XL, X1, and XO respectively; the shape of the generatrix where XL≤X≤X1, that is, that of the radially inner side portion 48a of the V-face 48 is given by $$Y=(X-XL)\times\tan \beta.$$

Furthermore, the shape of the generatrix where X1≤X≤XO, that is, that of the radially outer side portion 48b of the V-face 48 is given by $$Y=(X-XL)\times\tan \beta+C.$$

Here, β is the V-face angle and C is the misalignment corresponding to the X coordinate.

Figure 8:
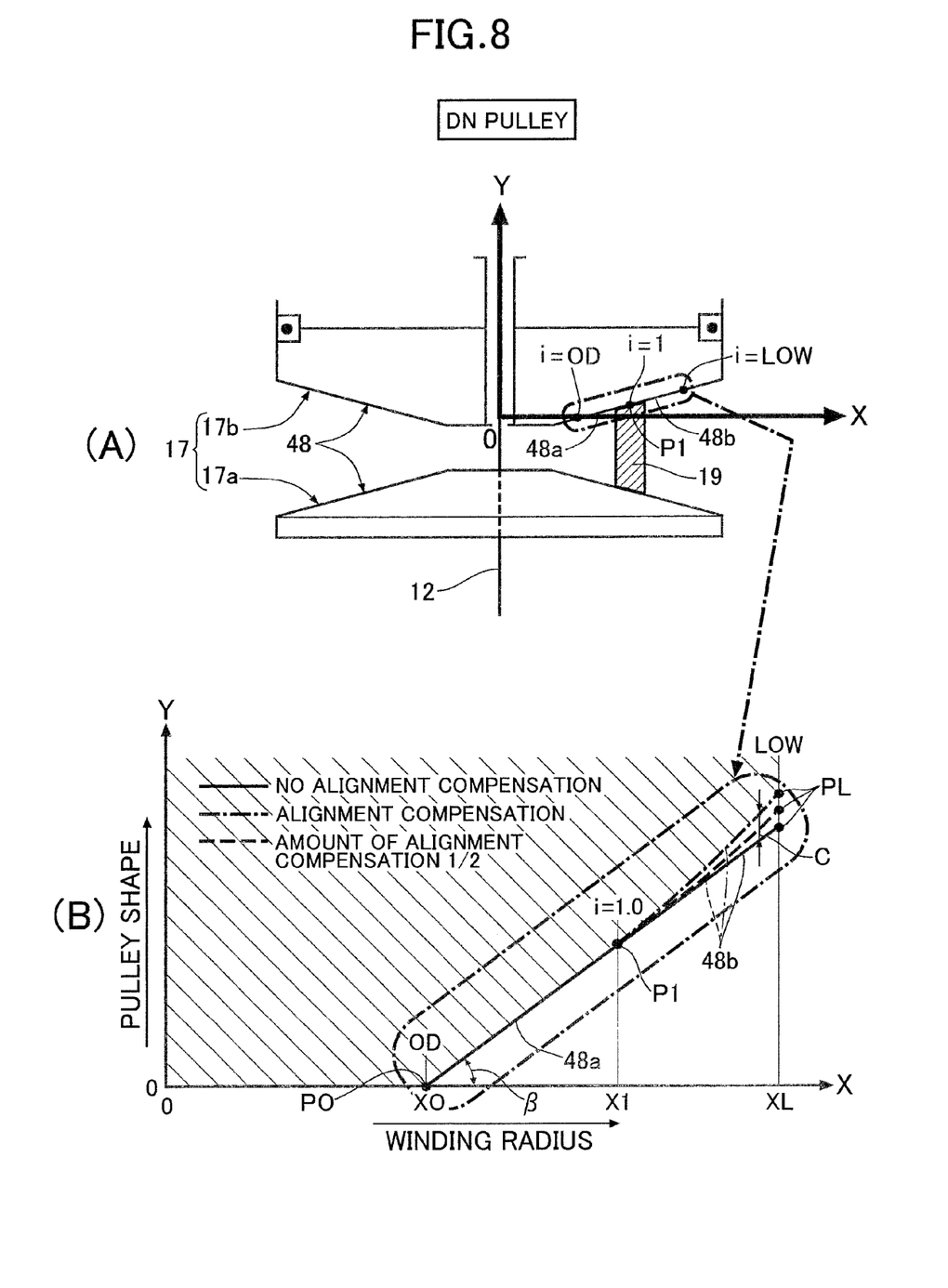
FIGS. 8A and 8B are diagrams for explaining the shape of the generatrix of the V-face of the driven pulley. (first embodiment)

FIG. 8 (A) shows the driven pulley 17, and the shape of a section of the V-face 48 encompassed by an oval is shown enlarged in FIG. 8 (B). In order to express the shape of the generatrix of the V-face 48 using an equation, a Y-axis is defined on the driven shaft 12 and an X-axis is defined on the radial direction of the driven pulley 17. P1 is a position of the contact point between the V-face 48 and the metal belt 19 when the gear ratio i is 1, and PO and PL are positions of the contact point when the gear ratio i is OD and LOW respectively. The X-axis is disposed so as to pass through PO. The X coordinates of PO, P1, and PL are XO, X1, and XL respectively; the shape of the generatrix where XO≤X≤X1, that is, that of the radially inner side portion 48a of the V-face 48 is given by $$Y=(X-XO)\times\tan \beta.$$

Furthermore, the shape of the generatrix where X1≤X≤XL, that is, that of the radially outer side portion 48h of the V-face 48 is given by $$Y=(X-XO)\times\tan \beta+C$$

Here, β is the V-face angle and C is the misalignment corresponding to the X coordinate.

FIGS. 9(A)-9(C) shows corrections, according to the misalignment C, of the shape of the generatrix of the radially outer side portions 48b and 48b of the fixed-side pulley half 15a of the drive pulley 15 and the fixed-side pulley half 17a of the driven pulley 17 in FIGS. 4(A)-4(C) above.

Figure 9:
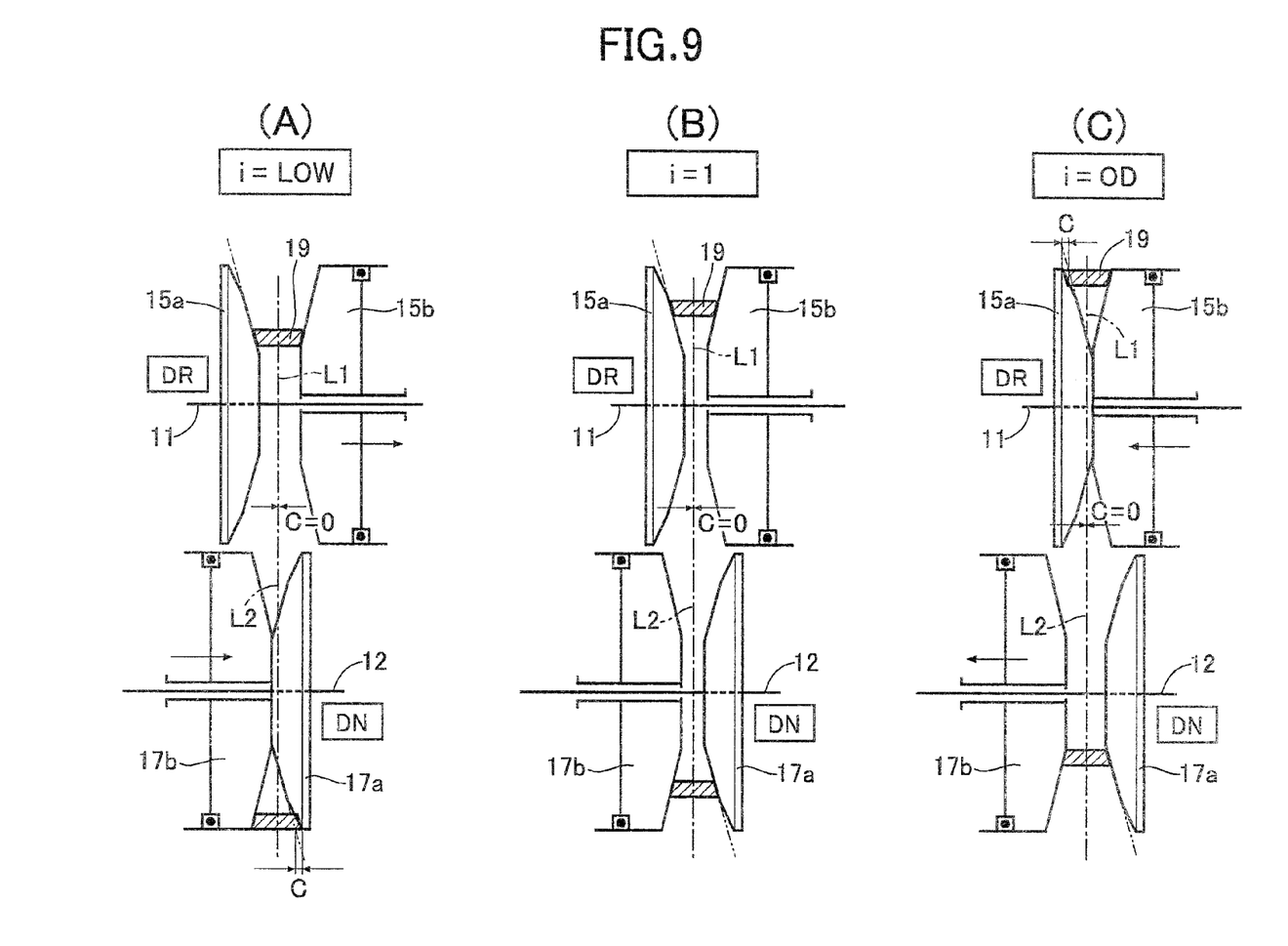
FIGS. 9A, 9B, and 9C are diagrams for explaining the effect of modification of the shape of the generatrix. (first embodiment)

FIG. 9 (B) shows a state in which the gear ratio i is 1; in this state the groove center line L1 of the drive pulley 15 and the groove center line L2 of the driven pulley 17 are aligned, the entire metal belt 19 is disposed within the same plane, and the misalignment C is zero. Here, since the metal belt 19 abuts against the border between the radially inner side portions 48a and 48a and the radially outer side portions 48b and 48b of the fixed-side pulley halves 15a and 17a, there is no influence from the shape of the generatrix of the radially outer side portions 48b and 48b being changed, and the misalignment C is maintained at zero as in the case of FIG. 4 (B).

FIG. 9 (A) shows a state in which the gear ratio i is LOW; in this state the misalignment C occurs such that the driven pulley 17 side is biased in the leftward direction relative to the drive pulley 15 side (see FIG. 4 (A)), but since the shape of the generatrix of the radially outer side portion 48b of the fixed-side pulley half 17a of the driven pulley 17 is corrected toward the right-hand side by an amount corresponding to the misalignment C, the groove center line L1 of the drive pulley 15 coincides with the groove center line L2 of the driven pulley 17, thus eliminating the misalignment C.

FIG. 9 (C) shows a state in which the gear ratio i is OD; in this state the misalignment C occurs such that the driven pulley 17 side is biased in the leftward direction relative to the drive pulley 15 side (see FIG. 4 (C)), but since the shape of the generatrix of the radially outer side portion 48b of the fixed-side pulley half 15a of the drive pulley 15 is corrected toward the left-hand side by an amount corresponding to the misalignment C, the groove center line L1 of the drive pulley 15 coincides with the groove center line L2 of the driven pulley 17, thus eliminating the misalignment C.

As hereinbefore described, in accordance with the present embodiment, since the Y coordinates of the generatrix of the radially outer side portion 48b of the V-face 48 are corrected by an amount corresponding to the misalignment C so as to give a curve shape, not only is it possible to compensate for the influence of the misalignment C, but it is also possible to ensure a sufficient coefficient of friction between the pulleys 15 and 17 and the metal belt 19 by making the shape of the generatrix of the radially inner side portion 48a of the V-face 48 a straight line, thereby preventing slip of the metal belt 19 against the pulleys 15 and 17. The reason therefor is explained below.

The coefficient of friction between the V-face 48 of the pulleys 15 and 17 and the metal element 42 of the metal belt 19 is not constant; when the shape of the generatrix of the V-face 48 is a straight line the coefficient of friction is large, and when the shape of the generatrix of the V-face 48 is a curved line the coefficient of friction is small. The reason therefor is that the pulleys 15 and 17 are not in direct contact with the metal belt 19, a film of lubricating oil being present on the parts that are in contact. When the shape of the generatrix of the V-face 48 is a curved line, compared with a case in which it is a straight line, the area of the parts that are in contact is small, the shear strength of the oil film is therefore small, and the coefficient of friction decreases. On the other hand, when the shape of the generatrix of the V-face 48 is a straight line, the area of the parts that are in contact is large, the shear strength of the oil film is therefore large, and the coefficient of friction increases.

In this way, among the radially inner side portion 48a and the radially outer side portion 48b of the V-face 48, the radially inner side portion 48a, whose generatrix shape is a straight line, has a high coefficient of friction, and the radially outer side portion 48b, whose generatrix shape is a curved line, has a low coefficient of friction.

Figure 10:
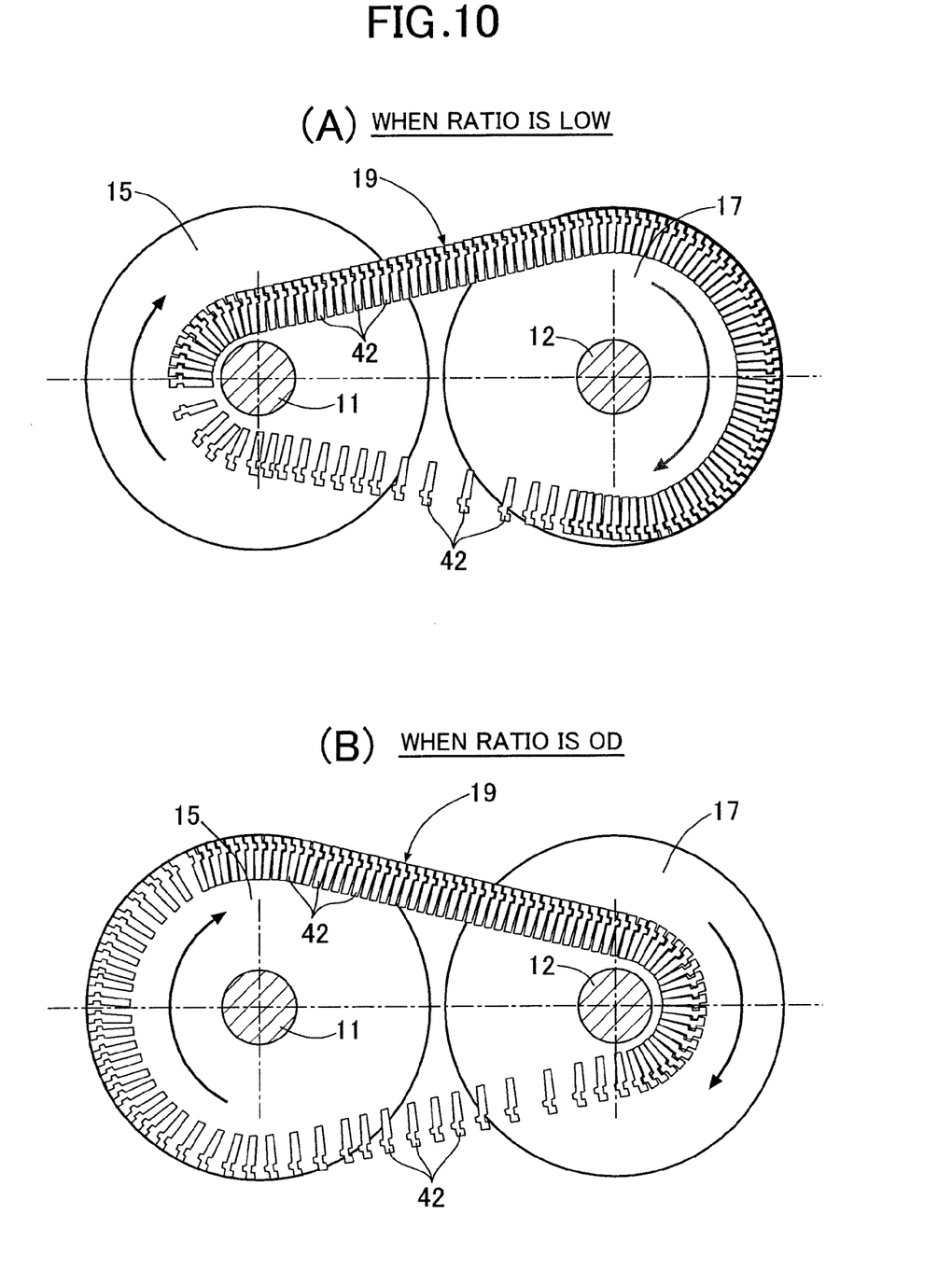
FIGS. 10A and 10B are diagrams for explaining a state in which a metal ring is wound around the pulleys. (first embodiment)

FIG. 10 (A) shows the state of the metal belt 19 when the gear ratio i is LOW; the winding radius of the metal belt 19 is small on the drive pulley 15 side and large on the driven pulley 17 side. Therefore, the number of metal elements 42 engaging with the drive pulley 15 is smaller than the number of metal elements 42 engaging with the driven pulley 17. Furthermore, the transmission torque is given by the product of the frictional force borne by each metal element 42, the number of metal elements 42 engaging with the pulley, and the distance from the axis to the position of winding; for the drive pulley 15 side, since the number of metal elements 42 engaging therewith and the distance from the axis to the position of winding are both small, the frictional force borne by each metal element 42 is large. On the other hand, for the driven pulley 17 side, since the number of metal elements 42 engaging therewith and the distance from the axis to the position of winding are both large, the frictional force borne by each metal element 42 is small.

Therefore, whether or not slip occurs between the pulleys 15 and 17 and the metal belt 19 is determined by whether or not a sufficient coefficient of friction of the radially inner side portion 48a of the drive pulley 15 is ensured, and the coefficient of friction of the radially outer side portion 48b of the driven pulley 17 has hardly any influence. In the present embodiment, since the shape of the generatrix of the radially inner side portion 48a of the drive pulley 15 is formed so as to be a straight line and the coefficient of friction is large, it is possible to reliably prevent the metal belt 19 from slipping and, moreover, even if the shape of the generatrix of the radially outer side portion 48b of the driven pulley 17 is formed so as to be a curved line in order to compensate for the misalignment C, this does not cause the metal belt 19 to slip.

FIG. 10 (B) shows the state of the metal belt 19 when the gear ratio i is OD; the winding radius of the metal belt 19 is small on the driven pulley 17 side and is large on the drive pulley 15 side. Therefore, the number of metal elements 42 engaging with the driven pulley 17 is smaller than the number of metal elements 42 engaging with the drive pulley 15. Furthermore, the transmission torque is given by the product of the frictional force borne by each metal element 42, the number of metal elements 42 engaging with the pulley, and the distance from the axis to the position of winding; for the driven pulley 17 side, since the number of metal elements 42 engaging therewith and the distance from the axis to the position of winding are both small, the frictional force borne by each metal element 42 is large. On the other hand, for the drive pulley 15 side, since the number of metal elements 42 engaging therewith and the distance from the axis to the position of winding are both large, the frictional force borne by each metal element 42 is small.

Therefore, whether or not slip occurs between the pulleys 15 and 17 and the metal belt 19 is determined by whether or not a sufficient coefficient of friction of the radially inner side portion 48a of the driven pulley 17 is ensured, and the coefficient of friction of the radially outer side portion 48b of the drive pulley 15 has hardly any influence. In the present embodiment, since the shape of the generatrix of the radially inner side portion 48a of the driven pulley 17 is formed so as to be a straight line and the coefficient of friction is large, it is possible to reliably prevent the metal belt 19 from slipping and, moreover, even if the shape of the generatrix of the radially outer side portion 48b of the drive pulley 15 is formed so as to be a curved line in order to compensate for the misalignment C, this does not cause the metal belt 19 to slip.

An embodiment of the present invention is explained above, but the present invention may be modified in a variety of ways as long as the modifications do not depart from the scope and spirit thereof.

For example, the endless power transmission belt of the present invention is not limited to the metal belt 19 of the embodiment and may be a metal chain.

Furthermore, in the embodiment, the border between the radially inner side portion 48a and the radially outer side portion 48b of the V-face 48 is set at a position at which the metal belt 19 comes into contact with the V-face 48 when the gear ratio i=1, but the border is not limited to the position at which the metal belt 19 comes into contact with the V-face 48 when the gear ratio i=1 and may be a position that deviates therefrom toward the radially inner side or the radially outer side. However, if it is set at the position for the gear ratio i=1, a balance between compensation for the misalignment C and prevention of slip of the metal belt 19 can most appropriately be achieved.

Moreover, in the embodiment the amount of correction of the radially outer side portion 48b of the V-face 48 is made to coincide with the value of the misalignment C (see single-dotted broken lines in FIGS. 7(A)-7(B) and 8(A)-8(B)), but any amount of correction may be set, and it may be set at for example half (C/2) of the misalignment C (see broken lines in FIGS. 7(A), 7(B), 8(A), and 8(B)). When the amount of correction is large the effect of compensation for the misalignment C is high but the amount by which the coefficient of friction is reduced is large, and when the amount of correction is small the effect of compensation for the misalignment C is low but the amount by which the coefficient of friction is reduced is small.

The invention claimed is:

1. An endless power transmission belt-type continuously variable transmission comprising a drive pulley formed from a fixed-side pulley half and a movable-side pulley half, a driven pulley formed from a fixed-side pulley half and a movable-side pulley half, and an endless power transmission belt wound around a V-face of the drive pulley and a V-face of the driven pulley, a gear ratio being changed by increasing a groove width of one of the drive pulley and the driven pulley and decreasing a groove width of the other, wherein in that the V-faces of at least the fixed-side pulley halves of the drive pulley and the driven pulley have a straight-line shape for the generatrix of a portion that is radially further inside than a predetermined position and have a curved shape for the generatrix of a portion that is radially further outside than the predetermined position, the curved shape being curved in a direction that compensates for a misalignment of the endless power transmission belt.

2. The endless power transmission belt-type continuously variable transmission according to claim 1, wherein the shape of the generatrix of the V-faces of the movable-side pulley halves of the drive pulley and the driven pulley is symmetrical to the shape of the generatrix of the V-faces of the fixed-side pulley halves of the drive pulley and the driven pulley.

3. The endless power transmission belt-type continuously variable transmission according to claim 1, wherein the predetermined position is a position at which the endless power transmission belt makes contact with the V-faces of the drive pulley and the driven pulley when the gear ratio is 1.

4. The endless power transmission belt-type continuously variable transmission according to claim 1, wherein an amount of compensation for the misalignment is set so as to be less than the misalignment value.

5. The endless power transmission belt-type continuously variable transmission according to claim 2, wherein the predetermined position is a position at which the endless power transmission belt makes contact with the V-faces of the drive pulley and the driven pulley when the gear ratio is 1.

6. The endless power transmission belt-type continuously variable transmission according to claim 2, wherein an amount of compensation for the misalignment is set so as to be less than the misalignment value.

7. The endless power transmission belt-type continuously variable transmission according to claim 3, wherein an amount of compensation for the misalignment is set so as to be less than the misalignment value.

8. The endless power transmission belt-type continuously variable transmission according to claim 5, wherein an amount of compensation for the misalignment is set so as to be less than the misalignment value.

* * * * *